Jan. 29, 1963     C. H. McALPINE ETAL     3,075,671
PANEL DISPENSING DEVICE
Filed July 14, 1958                                                  5 Sheets-Sheet 2

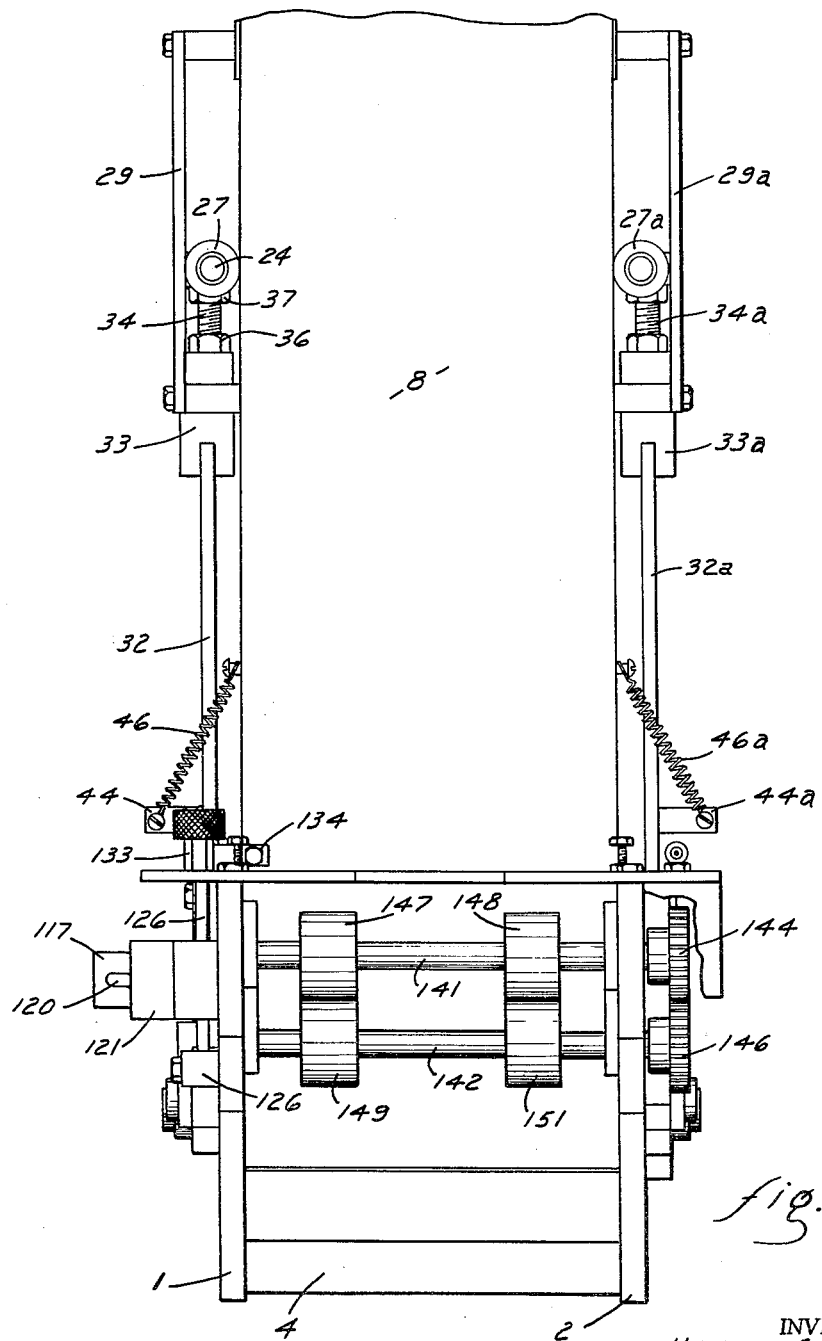

INVENTORS
HERBERT C. WINKEL
CHARLES H. McALPINE
BY KENNETH G. McGOWAN
Woodhams, Blanchard and Flynn
ATTORNEYS

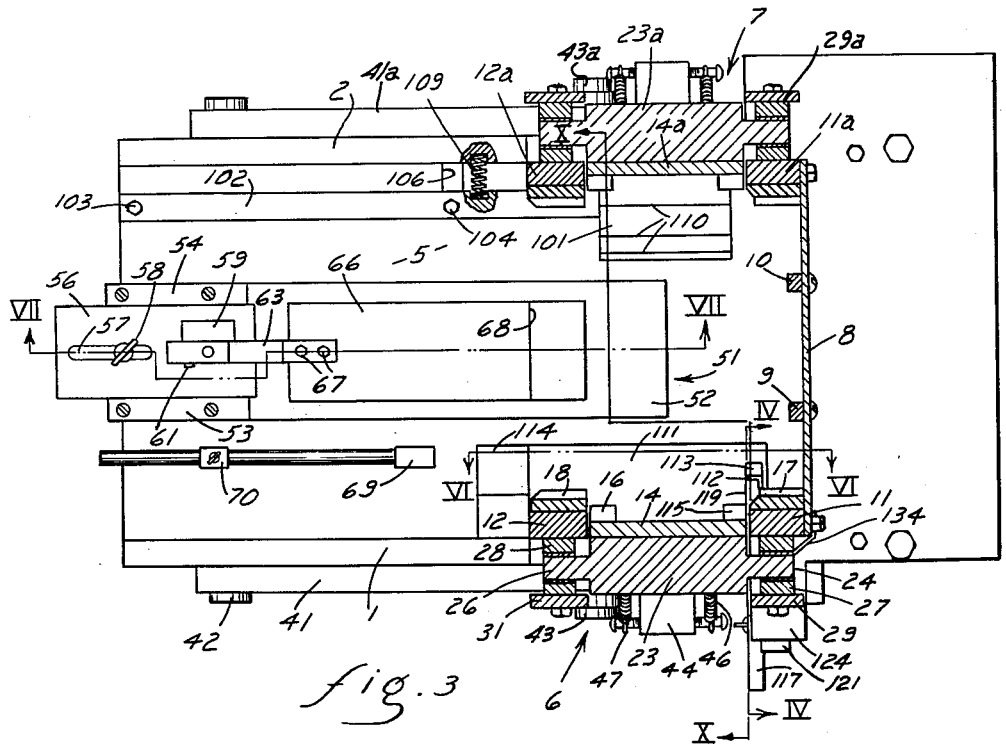
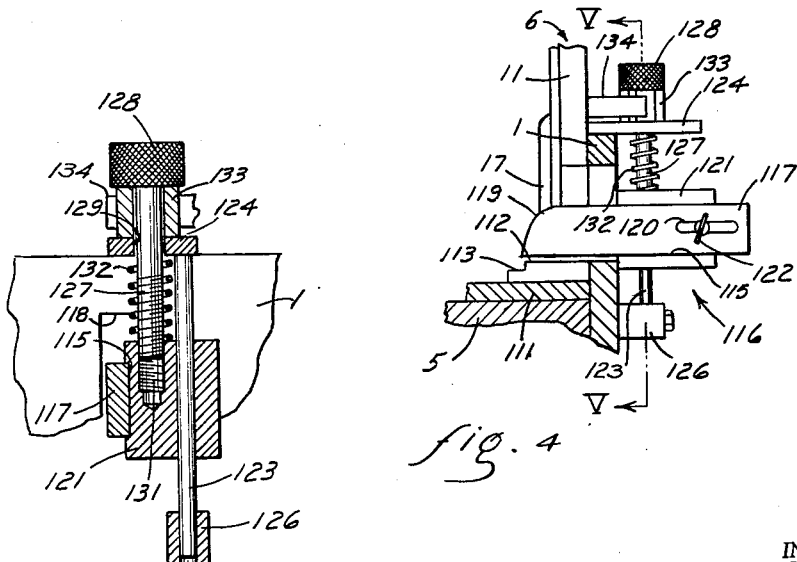

Jan. 29, 1963

C. H. McALPINE ETAL 3,075,671

PANEL DISPENSING DEVICE

Filed July 14, 1958

INVENTORS
HERBERT C. WINKEL
CHARLES H. McALPINE
KENNETH G. McGOWAN
BY Woodhams, Blanchard & Flynn
ATTORNEYS

# United States Patent Office 3,075,671
Patented Jan. 29, 1963

3,075,671
PANEL DISPENSING DEVICE
Charles H. McAlpine, Coloma, Kenneth G. McGowan, Lawrence Township, Van Buren County, and Herbert C. Winkel, Watervliet, Mich., assignors to Winkel Machine Co., Inc., Watervliet, Mich., a corporation of Michigan
Filed July 14, 1958, Ser. No. 748,370
9 Claims. (Cl. 221—238)

This invention relates to a machine for feeding panels from a stack and, more particularly, relates to a machine for feeding battery plates and separators, one at a time, from the bottom of a stack in a substantially horizontal direction. The application relates to an improvement in the machine disclosed in application Serial No. 482,716, filed January 19, 1955, now Patent No. 2,930,508 of which applicants Winkel and McAlpine are co-inventors.

In the aforementioned application there is disclosed a machine for feeding panels, particularly battery plates and separators, which machine has a reciprocable shuttle engageable with the lowermost panel of the stack for feeding said panel horizontally together with means for lifting most of the stack off the lowermost panel as the shuttle moves forwardly. While the prior machine has, in general, operated satisfactorily, under certain circumstances it has not operated with the efficiency and speed which is desired for a machine of this type particularly where battery plates were being fed. The prior machine utilizes a vertically arranged, downwardly extending stripper plates whose lower end is spaced a closely controlled distance above the shuttle and which serves to limit forward movement of all of the panels except that one which is being fed by movement of the shuttle so that said one panel is separated from the other panels in the stack. It has been observed that upwardly bowed panels are difficult to feed on the aformentioned machine since the shuttle may not properly engage the panel and/or the central portion of the panel to be fed may abut against the lower edge of the stripper plate so that it cannot be fed thereunder. Further, battery plates are ordinarily formed by a casting operation and normally have some flash extending upwardly from the forward edge thereof. Such flash frequently abuts against the stripper plate and interferes with the forward movement of the panel being fed therebeneath. Thus, it is desired to provide a machine for feeding panels, which machine is of the same general type as that disclosed in the aforementioned application and which utilizes an improved shuttle structure and an improved structure for limiting forward motion of all but the lowermost panel in the stack.

Accordingly, it is an object of this invention to provide an improved machine for feeding panels, one at a time, from a stack.

It is a further object of this invention to provide an improved machine, as aforesaid, by which the panels may be properly fed even though the panels are bowed or have flash extending upwardly from the forward edge thereof.

It is a further object of this invention to provide an improved machine, as aforesaid, in which the lowermost panel of the stack is supported adjacent its side edges and a resiliently upwardly urged shuttle engages the trailing edge thereof midway between the sides thereof so that the panel will be positively fed by the shuttle even though it is not perfectly planar.

It is a further object of this invention to provide an improved machine, as aforesaid, in which the lowermost panel is positively retained in position for being engaged by the shuttle while the remainder of the stack is lifted upwardly thereof.

It is a further object of this invention to provide an improved machine, as aforesaid, in which the panel retaining means engages the lowermost panel along one side edge thereof and prevents upward movement thereof but permits forward movement thereof.

It is a further object of this invention to provide an improved machine, as aforesaid, which can be readily adjusted for handling panels of various sizes and thickness and which, when adjusted, will remain in proper adjustment for long periods of time.

It is a further object of this invention to provide an improved machine, as aforesaid, which is inexpensive to manufacture, of sturdy and durable construction and, therefore, inexpensive to maintain in operating condition.

Other objects and advantages of the invention will be apparent to those acquainted with machines of this type upon reading the following description and inspecting the accompanying drawings.

In the drawings:

FIGURE 1 is a front elevational view of the improved panel feeding machine.

FIGURE 3 is a sectional view taken along the line III—III of FIGURE 2.

FIGURE 4 is a sectional view taken along the line IV—IV of FIGURE 3.

FIGURE 5 is a sectional view taken along the line V—V of FIGURE 4.

General Description

In general, the invention provides a machine having a substantially vertically extending zone within which a stack of panels may be received. A platform is located at the lower end of the zone and panel retaining means are located adjacent one side edge of said zone adjacent said platform and are spaced upwardly therefrom a sufficient distance that a preselected number of the lowermost panels in the stack, usually one, may be received thereunder and may be held against upward movement thereby. The platform has means thereon adjacent the other side edge of the zone which means is movable transversely of said zone toward and away from the retaining means. The last-mentioned means is engageable with the other side edge of the lowermost panel in the stack so that same may be moved thereby beneath the retaining means. A shuttle is positioned above said platform and is movable forwardly and rearwardly with respect thereto. The shuttle includes a resiliently mounted plate which engages the lowermost panel in the stack. The movement of the shuttle is coordinated with the movement of the means engageable with the other side edge of the lowermost panel in the stack so that the lowermost panel is moved beneath the retaining means and then the shuttle is moved forwardly to move the lowermost panel forwardly out of the zone.

Detailed Description

Figures 2, 9:
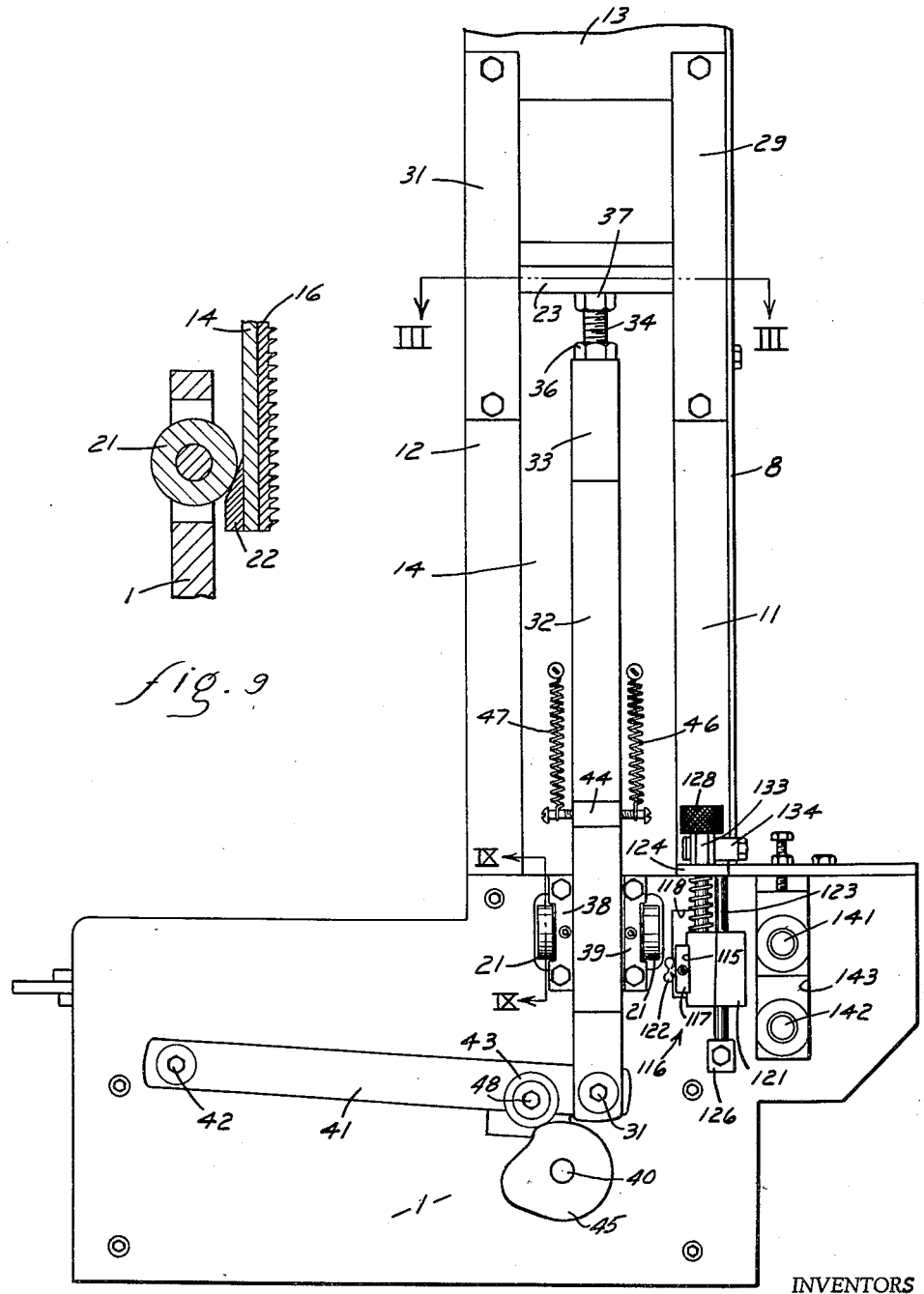
FIGURE 2 is a side elevational view of the improved panel feeding machine as viewed from the leftward side thereof as appearing in FIGURE 1.
FIGURE 9 is a sectional view taken along the line IX—IX of FIGURE 2.

Throughout the following description certain terminology will be employed for convenience in reference and it will be understood that such terminology is for convenience only and has no limiting significance. For example, the terms "forward," "rearward," and derivatives thereof, will refer to the ends of the machine, respectively, toward which the material feeds and from which the material feeds, that is, the rightward end of the machine as appearing in FIGURE 2 will be termed the "forward" end of the machine and the leftward end thereof as shown in FIGURE 2 will be termed the "rearward" end of the machine. The terms "upward," "downward," and derivatives thereof, will refer to the machine in its normal position of operation, as shown in FIGURES 1 and 2. The terms "outward," "inward," and derivatives thereof, will refer to directions away from and toward the geometric center of the machine, respectively.

Figure 8:
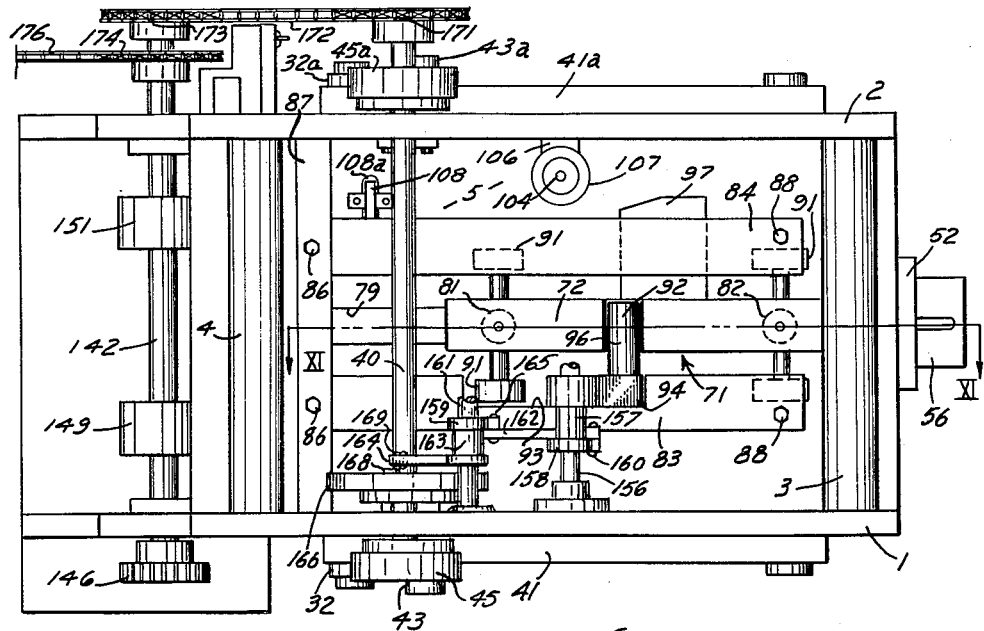
FIGURE 8 is a bottom view of the machine appearing in FIGURE 1.

Referring to the drawings in detail, the machine includes a frame consisting of upwardly extending side plates 1 and 2 held together by rods, of which two are shown at 3 and 4 (FIGURE 8). A stationary horizontal platform 5 extends between the side plates 1 and 2 and is secured thereto adjacent the upper edges thereof. Means defining a panel receiving zone is secured to the frame and extends upwardly from the platform adjacent the forward end thereof. The structure defining the panel receiving zone includes a pair of side structures 6 and 7 and an upwardly extending front plate 8. The front plate 8 is secured to and extends between the forward edges of the side structures 6 and 7 and has a pair of transversely spaced guide bars 9 and 10 (FIGURE 3) secured to the inner surface thereof for guiding vertical movement of the panels in the stack.

The side structures 6 and 7 are identical and, accordingly, only side structure 6 will be described in detail herein, it being understood that this description applies as well to side structure 7. Corresponding parts of side structure 7 will be identified with the same reference numerals with the suffix "a" applied thereto.

Figure 6:
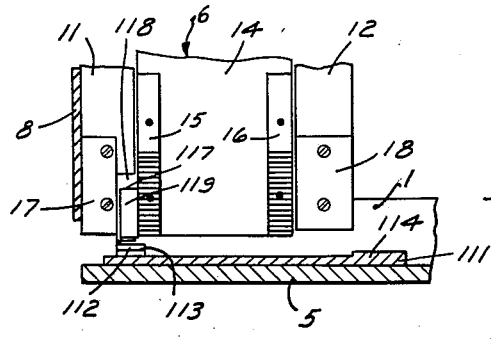
FIGURE 6 is a sectional view taken along the line VI—VI of FIGURE 3.

The side structure 6 includes a pair of stationary, transversely spaced, upwardly extending bars 11 and 12 which are joined together at their upper ends by a plate 13 (FIGURE 2). A vertically movable plate 14 is disposed between the bars 11 and 12 below the plate 13 and is movable upwardly and downwardly, as well as inwardly and outwardly, with respect thereto. A pair of transversely spaced, vertically extending, elongated, toothed members 15 and 16 (FIGURES 3 and 6) are secured to the plate 14 adjacent the forward and rearward edges thereof, respectively, and are located adjacent the upper surface of the platform 5. The toothed members 15 and 16 are engageable with the side edges of the panels in the lower portion of the stack, not including the panel to be fed, and are adapted to lift same off the panel to be fed as will be described in greater detail hereinbelow. The bars 11 and 12 have inwardly and downwardly sloping cam blocks 17 and 18 secured thereto at the lower end thereof, which blocks guide the panels to a predetermined position when they reach the bottom of the stack.

The plate 14 (FIGURE 6) extends downwardly alongside the side plate 1 substantially to the upper surface of platform 5. A pair of rollers 21 (FIGURES 2 and 9) are rotatably mounted in the side plate 1 and engage cams 22 (FIGURE 9) on the outer surface of plate 14 so that as said plate is moved upwardly by the means to be described hereinbelow, it is moved inwardly by said rollers into gripping engagement with the side edges of the panels in the lower portion of the stack.

A block 23 is fixedly secured, as by welding, to plate 14 adjacent the upper end thereof and said block has a pair of shafts 24 and 26 (FIGURE 3) extending, respectively, forwardly and rearwardly therefrom. A pair of rollers 27 and 28 are journaled, respectively, on the shafts 24 and 26. A pair of vertically extending guide strips 29 and 31 are mounted on and extend parallel with the bars 11 and 12, respectively, adjacent the upper ends thereof. The rollers 27 and 28 are received, respectively, between the bar 11 and strip 29 and the bar 12 and strip 31 and are guided for vertical movement thereby.

A vertically extending lifting element 32 extends upwardly alongside the side plate 1 and thence alongside the plate 14. The lifting element 32 has a fixture 33 on its upper end and said fixture has a bolt 34 threaded thereinto and extending upwardly therefrom and threaded into the block 23. A pair of lock nuts 36 and 37 are threaded onto the bolt 34 to adjustably lock same in position to obtain proper spacing of the upper end of the lifting element and the block 23. The lifting element 32 extends vertically and slidably between a pair of guide members 38 and 39 (FIGURE 2) on the side plate 1 and is pivotally connected by pin 31 to one end of a lever 41. The lever 41 is pivotally mounted on a shaft 42 at the other end thereof which shaft is mounted on the side plate 1. A cam follower 43 is rotatably mounted by pin 48 on lever 41 intermediate the ends thereof and is engageable by cam means 45, which is mounted upon one end of the shaft 40 for rotation therewith. Said shaft 40 extends through, and is rotatably supported upon, the side plates 1 and 2. Another cam 45a (FIGURE 8) is mounted upon the other end of the shaft 40 for engagement with the cam follower 43a on the lever 41a. Rotation of the shaft 40, hence of the cam 45, effects a pivoting of said lever 41 about shaft 42 to thereby cause upward and downward movement of the element 32, hence of the plate 14. A corresponding movement of the plate 14a is similarly effected by the cam 45a, lever 41a and element 32a. A block 44 is secured to the lifting element 32 and a pair of coil springs 46 and 47 are connected to said block and to plate 14 and urge said plate against the rollers 21. Since the pin 31 follows a slightly arcuate path during the raising and lowering of the lever 41, the lower end of the element 32 may be moved sidewardly a small amount. Thus, the guide members 38 and 39 are sufficiently spaced from each other to allow for such sideward movement of the element 32.

The block 23 is capable of rotating about the axis of rollers 27 and 28 to a slight extent determined by the clearance between the lower end of lifting element 32 and the parts guiding and effecting vertical movement thereof. The plate 14 is relatively long and thin and the cams 22 at the lower end thereof engage the rollers 21 when the lifting element 32 is raised and such causes flexing of the plate so that the lower end thereof is moved inwardly with respect to the upper end thereof. Thus, upon upward movement of lifting elements 32 the lower end of the plates 14 and 14a are moved inwardly and are lifted so that the toothed members 15 and 16 engage the side edges of the panels in the lower portion of the stack and lift same off the panel to be fed.

Figure 7:
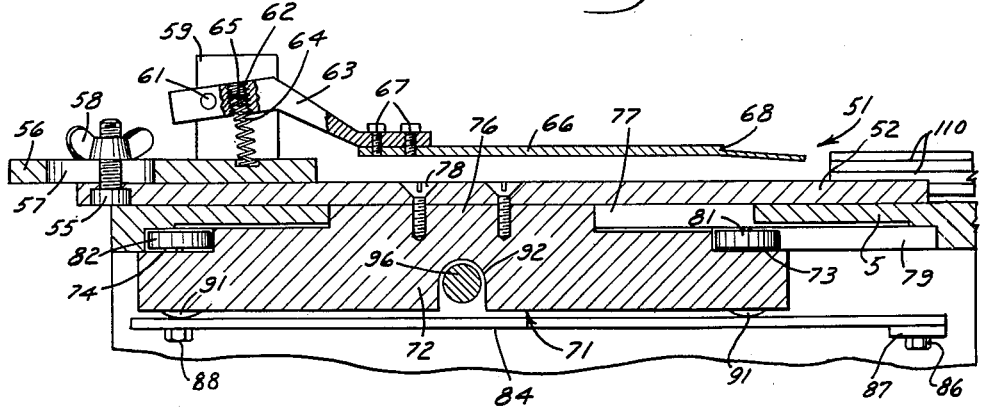
FIGURE 7 is a sectional view taken along the line VII—VII of FIGURE 3.

A shuttle structure 51 (FIGURE 3) is mounted above platform 5 and includes a lower plate 52 which is parallel with and closely adjacent the upper surface of said platform. A pair of parallel spaced guide bars 53 and 54 are secured to plate 52 adjacent the rearward end thereof. A mounting plate 56, having an elongated slot 57 therein, is mounted between the guide bars 53 and 54 and is slidable therebetween forwardly and rearwardly with respect to plate 52. A bolt 55 is secured to the lower plate 52 and extends upwardly through the elongated slot 57 in plate 56. A wing nut 58 is threaded onto the bolt 55 and is adapted to releasably lock the mounting plate 56 in predetermined adjustable position with respect to the lower plate 52. A mounting block 59 is secured to the plate 56 and has a pivot shaft 61 extending sidewardly therefrom. A pivot arm 63 is pivotally mounted on pivot shaft 61. A coil spring 64 (FIGURE 7) is positioned between the lower surface of arm 63 and the upper surface of plate 52 and urges the arm 63 upwardly. The upper end of the spring 64 is received within a threaded opening 62 in the arm 63 and abuts against a set screw 65 therein. A panel engaging plate 66 is secured to the forward end of pivot arm 63 by bolts 67 and extends forwardly therefrom. If no panels are located in the panel zone, the plate 66 will be spaced upwardly from the plate 52 by the spring 64. The plate 66 has an upstanding ledge 68 thereon which is adapted to engage the trailing edge of the lowermost panel of the stack. When panels are located in the zone, the plate 66 will be in its lower position wherein it is adjacent and substantially parallel with the plate 52 but it will be free to move upwardly to whatever extent is necessary to accommodate bowing of the lowermost panel so that the ledge 68 will always drivingly engage the central portion of the trailing edge of the lowermost panel.

A barrier 69 (FIGURE 3) is located above the platform 5 and is adapted to engage the rearward edge of the panels in the stack to locate same in a predetermined position. The barrier 69 is slidably received through a guide block 70 whereby it may be releasably locked in adjustable position with respect to the front member 8 in order to accommodate panels of different sizes.

A carriage 71 (FIGURES 7 and 8) is positioned below the platform 5 and is supported for forward and rearward movement with respect thereto. The carriage includes a downwardly extending block 72 having cutaway portions 73 and 74 on the upper side thereof adjacent the respective axial ends thereof. The central portion 76 of the block 72 extends upwardly through an elongated slot 77 in the platform 5 and is secured to plate 52 in any suitable manner, such as by screws 78. The slot 77 is sufficiently longer than the length of the upwardly extending portion 76 that said portion is moving from one end to the other end of said slot will move the shuttle structure 51 a sufficient distance to obtain proper feeding of the panel thereby. The platform 5 has an elongated groove 79 formed in the lower surface thereof, which groove is aligned with and extends beyond the respective axial ends of the slot 77. Rollers 81 and 82 are positioned within the cutaway portions 73 and 74 and are mounted on block 72 for rotation about vertical axes. The rollers 81 and 82 ride within the groove 79 and thereby closely guide the forward and rearward movement of the carriage 71.

A pair of transversely spaced, elongated guide plates 83 and 84 are located below the platform 5 spaced therefrom and parallel therewith. The plates 83 and 84 are connected at their forward ends, as by bolts 86, to a crossbar 87. The crossbar 87 is secured in any suitable manner, as by welding, to the side plates 1 and 2. The rearward ends of the guide plates 83 and 84 are secured to the platform and held in parallel, spaced relation with respect thereto in any suitable manner, such as by bolts 88.

The block 72 has two pairs of rollers 91 mounted thereon and located, respectively, adjacent the opposite axial ends thereof, the rollers of each pair being located, respectively, on opposite sides of said block. The rollers 91 are received between the guide plates 83 and 84 and the lower surface of the platform 5 and movably support the carriage 71 on said guide plates.

The block 72 has an upstanding notch 92 formed therein substantially midway between the axial ends thereof. The guide plate 83 has a portion thereof cut away to define an axially extending notch 93 substantially midway between the axial ends thereof. An actuator 94 of any suitable construction may be received within the notch 93 and may be guided for forward and rearward movement therewithin. The actuator 94 has a pin 96 extending therefrom into the notch 92 whereby forward and rearward movement thereof will effect corresponding movement of the carriage 71 and the shuttle structure 51.

Figure 11:
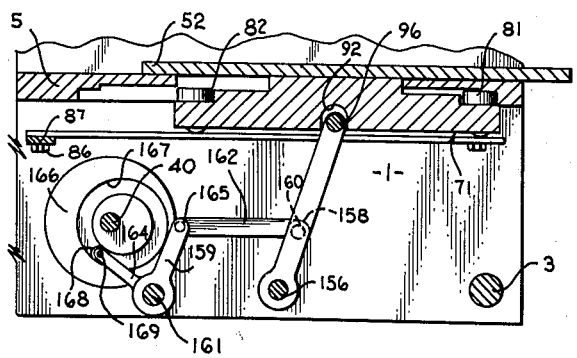
FIGURE 11 is a sectional view taken along the line XI—XI in FIGURE 8.

As shown in FIGURES 8 and 11, the actuator 94 is pivotally supported near its lower end upon the pivot shaft 156 which extends between and is supported upon the side plates 1 and 2. The lower end of the actuator 94 is rigidly connected to the sleeve 157 which encircles the shaft 156 and is also rigidly secured to the crank 158. Thus, pivotal movement of the crank 158 results in pivotal movement of the actuator 94 which produces a lengthwise reciprocation of the carriage 71. The sleeve 163, which is pivotally supported upon the shaft 161, is rigidly secured to the crank 159 and the crank 164. The cranks 158 and 159 is pivotally connected to the bar 162 by means of the pivot pins 160 and 165, respectively. Thus, pivotal movement of the crank 164 results in reciprocation of carriage 71.

A cam 166 (FIGURE 11) is secured to and supported upon the cam shaft 40 adjacent the side plate 1. The cam 166 has an eccentric groove 167 for receiving the cam follower 168, which is rotatably supported upon the crank 164 by the pin 169. Accordingly, rotation of the cam shaft 40 results in pivotal movement of the cranks 159 and 164 which produces lengthwise reciprocation of the carriage 71. Rotation of shaft 40 acts through cams 45 and 45a to move the levers 41 and 41a, hence the lift elements 32 and 32a, upwardly and downwardly.

The block 72 has a cam member 97 (FIGURE 8) extending sidewardly therefrom adjacent the lower surface of the platform 5 for purposes which will be described in greater detail hereinbelow.

A panel engaging plate 101 (FIGURE 3) is located above the platform 5 adjacent the side structure 7. The plate 101 is mounted on the forward end of a lever 102 and the rearward end of said lever is connected to the platform 5 adjacent the rearward edge thereof for pivotal movement with respect thereto by a pivot pin 103. A bolt 104 extends downwardly from lever 102 intermediate the ends thereof and extends through a sidewardly extending slot 106 in the platform 5. The bolt 104 (FIGURE 8) has a roller 107 mounted thereon below the lower surface of the platform 5, which roller defines a cam follower engageable by the cam 97. As shuttle structure 51 moves forwardly, the cam 97 engages the roller 107 and thereby moves the plate 101 outwardly from its normal inward position. When the shuttle structure 51 is retracted, spring means 109 between the sideplate 2 and the lever 102 (FIGURE 3) moves said lever, hence the plate 101, inwardly to its normal position. A roller 108 (FIGURE 8) is mounted on the lower surface of the platform 5 and extends upwardly through a suitable slot 108a therein and engages the lower surface of the plate 101 to support said plate for the free sliding movement inwardly and outwardly. The plate 101 has a plurality of ledges or steps 110 formed thereon, which steps are adapted to engage the side edge of the lowermost panel in the stack, the respective steps being adapted to engage the side edges of panels of different widths.

A block 111 (FIGURES 3, 4 and 6) is secured to the upper surface of the platform 5 adjacent the side structure 6. The block 111 is formed to provide a pair of vertically and sidewardly offset supporting surfaces 112 and 113 adjacent the forward end thereof, said surfaces being located below the bar 11 (FIGURE 6) of the side structure 6. One or the other of the support surface 112 and 113 is adapted to engage and support the forward portion of the side edge of the lowermost panel depending on the width thereof. The block 111 also has a supporting surface 114 thereon adjacent the rearward end thereof for engaging the rearward portion of the side edge of the lowermost panel of the stack.

A panel retaining structure 116 (FIGURE 4) is mounted in the side structure 6. The panel retaining structure 116 includes a bar 117 which extends transversely through a notch 118 (FIGURE 6) in the lower end of the bar 11. The bar 117 is spaced vertically from and is positioned directly above the support surfaces 112 and 113. The bar 117 has an inwardly and downwardly sloping end surface 119 which guides the panels in the stack onto the surface 112 or surface 113 depending on the position of said bar. The outer end of the bar 117 is slidably received in groove 115 (FIGURE 5) in a guide block 121 and is guided for inward and outward movement therein. The bar 117 has an elongated slot 120 (FIGURE 4) therethrough adjacent the outer end thereof and a wing screw 122 extends through said slot and into said guide block 121 for releasably locking said bar in fixed, adjustable position with respect to said block.

The notch 118 (FIGURE 4) is of greater vertical extent than the bar 117 so that said bar may be moved upwardly and downwardly therein as may be necessary to accommodate panels of different thickness. This is accomplished by mounting the guide block 121 (FIGURE 5) for vertical sliding movement on a guide rod 123. The upper end of the guide rod 123 is affixed to a mounting plate 124 which extends sidewardly from the side plate 1. The lower end of the guide rod 123 is secured to a fixture 126 which is mounted upon the side plate 1. A bolt 127 (FIGURE 5) having a knurled head 128 extends downwardly through an opening 129 in the mounting plate 124 and is threaded into a suitable opening 131 in the guide block 121. A coil spring 132 surrounds the bolt 127 and is located between the lower surface of the mounting plate 124 and the upper surface of the guide block 121. A polygonal, as hexagonal, sleeve 133 is secured to the bolt 127 and extends from the lower surface of the head 128 thereof into sliding contact with the upper surface of the mounting plate 124. A leaf spring 134 is secured at one end thereof to the front member 8 adjacent the lower end thereof and extends sidewardly therefrom and is adapted to contact a flat surface of the sleeve 133 to thereby provide a lock to releasably hold the bolt 127 and thereby the guide block 121 in whatever positions they happen to be in at that time.

A pair of shafts 141 and 142 are received within vertically extending slots in the forward ends of the side plates 1 and 2, of which one slot is shown at 143 (FIGURE 2). The shafts 141 and 142 are supported in suitable bearings and have meshing gears 144 and 146 (FIGURE 1) mounted thereon whereby said shafts may be simultaneously rotated in opposite directions. These shafts have two axially spaced pairs of radially aligned discharge rollers 147, 148, 149 and 151 mounted thereon, the peripheries of the radially aligned rollers being in close association with each other whereby panels fed by the shuttle structure 51 are moved therebetween and are fed thereby outwardly of the machine onto a suitable receiver, such as a conveyor. The gears 144 and 146 may be rotated by any suitable external gearing arrangement (not shown). The discharge structure including the rollers 147, 148, 149 and 151 is substantially the same as that disclosed in the aforementioned application (Patent No. 2,930,508) and reference may be made thereto for further details of this structure.

One end of the cam shaft 40 (FIGURE 8) is secured to a sprocket 171 which is connected by a chain 172 to a sprocket 173 secured to one end of the shaft 142. A sprocket 174, which is also secured to the shaft 142, may be connected by the chain 176 to any convenient source of power, such as an electric motor (not shown). Accordingly, rotation of the shaft 142 by said source of power effects a rotation of the shaft 141 through the gears 146 and 144. Moreover rotation of shaft 142 also drives the cam shaft 40 through the sprockets 171 and 173 and the chain 172.

*Operation*

Figure 10:
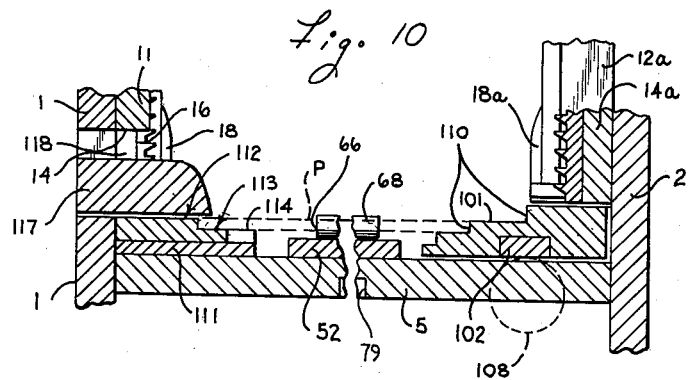
FIGURE 10 is a sectional view taken along the line X—X in FIGURE 3 with the bar 117 in a slightly different position.

In preparing the machine for operation, the bar 117 will be adjusted to direct the panels onto surface 112 or surface 113 as is appropriate for the width of the particular type of panels being handled and also will be adjusted into proper vertical spacing with respect to such surface so that the adjacent edge of the lowermost panel in the stack will be receivable therebetween and held against vertical movement thereby. Similarly, plate 66 will be adjusted so that the ledge 68 thereon engages the rearward edge of the lowermost panel in the stack when the shuttle structure 51 is in its rearward position. As shown in FIGURE 10, the bottom panel P may be supported upon the surfaces 113 and 114 of the block 111 and the corresponding step 110 of the plate 101, whereby the panel is held in a horizontal position. At least part of the plate 66 will be disposed under the panel P. The gears 144 and 146 will be continuously rotated in above-described fashion. The movement of carriage 71 and thereby the shuttle structure 51, will be properly coordinated with the lifting and inward movement of plates 14 and 14a by suitable control, as discussed above, over the operation of the actuator 94 and the cam means which engages the cam followers 43 and 43a.

Assuming that the carriage 71 and shuttle structure 51 are in their forwardmost position at the end of a feeding operation, at this time the panel engaging plate 101 is held in its outer position by cam 97. Also, the lifting elements 32 are raised and thereby support the plates 14 and 14a of side structures 6 and 7 in their upper and inward position so that at least most of the panels of the stack are supported off the feeding plate 66. As the carriage 71 and shuttle structure 51 are retracted, the lifting elements 32 will be moved downwardly by suitable operation of the cam followers 43 and 43a and the plates 14 and 14a will be moved outwardly so that the entire weight of a stack will come to rest on the plate 101, plate 66, surface 113, and surface 114. When the cam 97 clears cam follower 107, the plate 101 is moved by spring 109 into its inward position. During such movement, one of the steps 110 will engage the side edge of the lowermost panel P of the stack and will move same sidewardly with respect to the remainder of the stack so that the edge thereof will be received between surface 113 and the lower surface of the bar 117 and will be held against vertical movement thereby. Thus, the lowermost panel of the stack is held in a precisely predetermined position for engagement by the shuttle.

The forward motion of the shuttle 51 is coordinated with the upward vertical movement of the lifting elements 32 so that said lifting elements are moved to their upwardmost position and thereby cause the plates 14 to engage the side edges of the panels to lift most of the weight of the stack off the shuttle before the shuttle moves forwardly. When the shuttle moves forwardly, ledge 68 engages the rearward edge of the lowermost panel and urges it forwardly until it is received between rollers 147, 148, 149 and 151, and is moved thereby outwardly of the machine.

It will be observed that the forward member 8 of the panel receiving zone need not be closely vertically spaced with respect to the shuttle since it does not serve to separate the panel being fed from the remainder of the stack as is the case in the structure disclosed in the above-mentioned application. Rather, the panel is separated from the stack by the operation of the plate 101 and the bar 117. Moreover, even though panels may be bowed or have upstanding flash on the forward edge thereof, such will not interfere with the successful feeding of such panels since the resiliently upwardly urged plate 66 will accommodate bowing of the panels while the positioning and feeding of the panels is brought about by proper positioning of the side edge thereof where flash is ordinarily not present.

While the above described operation has referred to a feeding operation wherein only one panel is fed, it will be apparent that the machine can be adjusted for simultaneously feeding a plurality of panels if such is desired.

While a particular preferred embodiment of the invention has been described above, it will be understood that the invention contemplates such changes or modifications therein as lie within the scope of the appended claims.

What is claimed is:

1. A machine for feeding substantially flat panels from a stack, comprising in combination: means defining a substantially vertically extending zone within which a stack of panels may be received; a shuttle located at the lower end of said zone and drive means for moving said shuttle forwardly and rearwardly of said zone; article support means in the lower end of said zone; retaining means located adjacent one side edge of said zone, said retaining means being spaced upwardly from said article support means a distance so that a preselected number of panels may be received thereunder and may be held against upward movement thereby; panel-engaging means located at the lower end of said zone adjacent a side edge thereof, actuating means operably connected with said drive means for causing said panel engaging means to move sidewardly of said shuttle toward and away from said retaining means in response to movement of said drive means, so that said panel-engaging means engages a preselected number of panels at the bottom of the stack and moves same sidewardly to a position beneath said retaining means, said shuttle being engageable with the rearward edge of said preselected number of panels beneath said retaining means and being adapted to move said predetermined number of panels forwardly from beneath the stack after the sideward movement of said panels is effected.

2. A machine for feeding substantially flat panels from a stack, comprising in combination: means defining a substantially vertically extending zone within which a stack of panels may be received; a platform at the lower end of said zone; a pair of panel-engaging means supported upon said platform and having surfaces thereon for engaging the respective side edges of the lowermost panel in the stack for supporting said lowermost panel one of said panel-engaging means being movable toward and away from the other for effecting a sideward movement of said lowermost panel; means for moving said one panel-engaging means sidewardly prior to forward movement of said panel; a shuttle and actuating means for moving same forwardly and rearwardly above said platform, said shuttle including a resiliently mounted member movable between positions above and below said surfaces and adapted to engage the central portion of the lowermost panel of the stack between the side edges thereof, said member having upstanding means thereon engageable with the rearward edge of the lowermost panel for drivingly contacting same and moving same forwardly whereby said shuttle may move the lowermost panel of the stack forwardly even though the central portion of said panel is not coplanar with the side edges thereof.

3. A machine for feeding substantially flat panels from a stack comprising in combination: means defining a substantially vertically extending zone within which a stack of panels may be received; a platform at the lower end of said zone, said platform having article support means thereon for engaging the respective side edges of the lowermost panel in the stack for supporting said lowermost panel; a shuttle movable forwardly and rearwardly above said platform, said shuttle including a lower plate parallel with and closely adjacent the upper surface of said platform and slidable therealong; means for effecting said movement of said shuttle; an upper plate and means pivotally mounting said upper plate on said lower plate so that said upper plate is movable between positions above and below the panel-engaging surfaces of said article support means; spring means between said upper plate and said lower plate for normally urging said upper plate upwardly, said upper plate having an upstanding ledge thereon engageable with the rearward edge of the lowermost panel for drivingly contacting same and moving same forwardly whereby said shuttle may move the lowermost panel of the stack forwardly even though the central portion of said panel is not coplanar with the side edges thereof.

4. A machine according to claim 3 including a carriage below said platform for supporting said shuttle for movement, said platform having a forwardly extending slot therein and said carriage including a block extending upwardly through said slot; means securing said block to said lower plate; said block having a plurality of sidewardly extending rollers thereon and plate means parallel with and below said platform for supporting said sidewardly extending rollers and thereby supporting said block with respect to said platform; said block having upwardly extending rollers thereon; and guide means on the lower surface of said platform for guiding forward and rearward movement of said upwardly extending rollers and thereby guiding corresponding movement of said block and said shuttle.

5. A machine for feeding substantially flat panels from a stack, comprising in combination: a pair of side walls and a front wall defining a substantially vertically extending zone within which a stack of panels may be received; a platform at the lower end of said zone; a shuttle located above said platform and means for moving said shuttle forwardly and rearwardly of said zone; article support means on said platform; retaining means located adjacent one side wall of said zone, said retaining means including a bar extending through one of said side walls into said zone, said bar being spaced above the upper surface of said article support means a distance so that a preselected number of panels may be received thereunder and may be held against upward movement thereby; a plate positioned within said zone adjacent the other side wall thereof and adjacent the upper surface of said platform, said plate having upstanding means thereon for engaging a preselected number of panels at the bottom of the stack; means supporting said plate for movement toward and away from said one side wall; and means responsive to said movement of said shuttle for moving said plate toward said one side wall to move a preselected number of panels at the bottom of the stack sidewardly with respect to the remainder of the stack and beneath said retaining means, said shuttle in its rearward position being engageable with the rearward edge of said preselected number of panels beneath said retaining means and being adapted upon forward movement thereof to move said predetermined number of panels forwardly from beneath the stack.

6. A machine according to Claim 5 wherein said bar is received in a guide block located adjacent said one side wall; means in said guide block for supporting said bar for sideward movement toward and away from said zone; means supporting said guide block for upward and downward movement adjacent said one side wall; means for releasably locking said bar in adjustable fixed position on said block and means for releasably holding said guide block in a selected position with respect to said one side wall whereby said bar may be adjusted inwardly and outwardly as well as upwardly and downwardly within said zone.

7. A machine for feeding substantially flat panels from a stack of panels, comprising: means defining a substantially vertical zone within which a stack of panels may be received; a shuttle located at the lower end of said zone; drive means for moving said shuttle forwardly and rearwardly within said zone; article support means in the lower end of said zone; retaining means located adjacent one side of said zone, said retaining means being spaced upwardly from said article support means for reception of a panel thereunder whereby upward movement of said panel is opposed; panel engaging means located near the other side of said zone; actuating means operatively connected with said drive means for moving said panel engaging means toward and away from said one side of said zone whereby the panel at the bottom of the stack is moved under said retaining means, said shuttle being engageable with the rearward edge of said bottom panel for moving same forwardly from beneath the stack after the sideward movement of said bottom panel is effected.

8. A machine for feeding substantially flat panels from a stack thereof, comprising; means defining a substantially vertical zone within which a stack of panels may be received; a shuttle located at the lower end of said zone and drive means for moving said shuttle forwardly and rearwardly of said zone; a platform at the lower end of said zone; article support means mounted upon said platform adjacent the side edges of said zone for engaging and supporting the corresponding side edges of the lowermost panel, said support means including a block positioned on one side of said zone and movable toward the other side of said zone; actuating means operatively associated with said drive means for moving said block toward and away from the other side of said zone in response to movement of said shuttle; retaining means located adjacent the other side of said zone, said retaining means being spaced upwardly from said article support means so that the lowermost panel in the stack may be moved thereunder by said block and may be held thereby against upward movement; a plate mounted upon said shuttle for upward and downward movement between positions above and below the supporting surfaces on said article support means and resilient means urging said plate above said surfaces whereby the lowermost panel of the stack is engageable by said plate even though said panel is warped; and upstanding means on said plate engageable with the rearward edge of said lowermost panel.

9. A machine according to claim 7 wherein said article support means includes a pair of spaced support members located respectively near the front and rear ends of said one side of said zone; and wherein said retaining means includes a projection fixed with respect to said means defining the vertical zone and extending into said zone above at least one of said support members, whereby the forward and rearward ends of the bottom panel along said one side of said zone are held in predetermined positions with respect to said lower end of said zone, even though the portion of said bottom panel between said ends thereof is bowed out of line therewith.

References Cited in the file of this patent

UNITED STATES PATENTS

| | | |
|---|---|---|
| 403,432 | Knapp | May 14, 1889 |
| 741,939 | Shelton | Oct. 23, 1903 |
| 919,927 | Neumann et al. | Apr. 27, 1909 |
| 1,330,639 | Leumann | Feb. 10, 1920 |
| 1,805,029 | Baker | May 12, 1931 |
| 2,702,132 | Van Doran | Feb. 15, 1955 |